United States Patent [19]

Dixon et al.

[11] 3,862,284

[45] Jan. 21, 1975

[54] PROCESS FOR PRODUCING BLOW MOLDED THERMOPLASTIC ARTICLES HAVING IMPROVED BARRIER PROPERTIES

[75] Inventors: Dale D. Dixon, Kutztown; Donald G. Manly; Gerald W. Recktenwald, both of Allentown, all of Pa.

[73] Assignee: Air Products and Chemicals, Inc., Wayne, Pa.

[22] Filed: May 10, 1973

[21] Appl. No.: 358,985

[52] U.S. Cl. ............... 264/83, 260/96 HA, 264/85, 264/97, 264/98, 264/99
[51] Int. Cl. .... B29c 17/07, B29c 25/00, C08f 27/03
[58] Field of Search ............. 264/83, 89, 90, 92, 93, 264/94, 95, 96, 97, 98, 99, 85; 425/326 B, 387 B, 324 B, 242 B; 260/94.9 H, 260/96 HA

[56] References Cited

UNITED STATES PATENTS

| | | | |
|---|---|---|---|
| 2,811,468 | 10/1957 | Joffre | 264/83 X |
| 2,829,070 | 4/1958 | Osborn | 264/83 X |
| 3,184,358 | 5/1965 | Utz | 264/83 X |
| 3,338,998 | 8/1967 | Di Settembrini | 264/94 |
| 3,647,613 | 3/1972 | Scotland | 161/165 |

*Primary Examiner*—Jan H. Silbaugh
*Attorney, Agent, or Firm*—Richard A. Dannells, Jr.; Barry Moyerman

[57] ABSTRACT

The barrier properties of blow molded thermoplastic articles are greatly improved if a blowing gas containing about 0.1 to about 20% by volume fluorine is employed during the expansion stage of the blow molding operation.

8 Claims, No Drawings

PROCESS FOR PRODUCING BLOW MOLDED THERMOPLASTIC ARTICLES HAVING IMPROVED BARRIER PROPERTIES

BACKGROUND OF THE INVENTION

1. The Field of the Invention

This invention relates to an improvement in the process for manufacturing blow molded thermoplastic articles.

2. Prior Art

It is well known to blow mold bottles and other hollow articles from thermoplastic materials by extruding the materials through an annular extrusion nozzle to form a parison of the thermoplastic and, after the parison has been enclosed within a mold and the ends of the parison have been sealed together, blowing the parison while still in a molten state with a compressed fluid or blowing gas, usually air, to conform the parison with the contour of the surrounding mold cavity; see U.S. Pat. No. 2,724,860.

Examples of thermoplastic materials which are moldable at their softening points and which can be employed in the production of blow molded articles include polymers and copolymers of polystyrene, polyacrylonitrile, polyvinyl chloride, and polyolefins of at least one aliphatic mono-1-olefin having a maximum of 8 carbon atoms per molecule.

The resulting blow molded articles from such prior art processes, particularly polyolefins, all have the disadvantage of being sufficiently permeable to allow the passage of atmospheric gases into the bottles and the escape of materials in their gaseous or liquid form through the walls of the bottles. Prior art methods for improving the barrier properties and rendering the blow molded bottles of polyethylene relatively impermeable to the passage of vapors is described in U.S. Pat. No. 2,811,468. The method comprises treating polyethylene film and bottles that have been thoroughly cleaned with 2% to 100% by volume fluorine and the balance, if any, of nitrogen, air, Freon and the like at temperatures not exceeding 50°C. for a period of 5 minutes to 3 hours. The exposure times required to incorporate sufficient quantities of fluorine, i.e. from 0.03% to 3.5% by weight, into the bottles are much too long for such a method to be economical. Furthermore, the additional steps of cleaning the bottles and then treating them with fluorine requires separate equipment and additional utilities and time.

SUMMARY OF THE INVENTION

In accordance with the present invention, a blowing gas containing about 0.1 to about 20% by volume fluorine is employed in the blow molding operation. Specifically, in the production of blow molded thermoplastic articles, wherein a parison of the thermoplastic is formed and the parison is then expanded within a closed mold to conform to the contour of the mold by a fluid medium, the present invention relates to the improvement which comprises mixing the fluorine into the fluid medium prior to expanding the parison and then recovering the resulting articles having improved barrier properties. It has been found that the physical properties of the blow molded articles can be further improved by mixing into the fluid medium in addition to fluorine other reactive gases such as sulfur dioxide, carbon monoxide, carbon dioxide, oxygen, chlorine, bromine or mixtures thereof.

More specifically, the present invention relates to an improved process for producing blow molded hollow articles or containers which comprises heating the thermoplastic to a temperature at or above its softening point; forming a parison of the resulting semi-fluid mass; closing a mold around the parison and sealing the ends of the parison; expanding the parison within the closed mold to conform the parison to the contour of the mold by means of the fluorine-containing fluid medium; removing the fluid medium from the resulting article and recovering the article from the process. Before the resulting article is removed from the mold, it is customarily cooled by passing a coolant such as water through the mold. The article may then be purged with an inert gas while in the mold or in a subsequent operation to remove the fluorine-containing medium.

The addition of about 0.5 to about 20% by volume of sulfur dioxide to the fluorine-containing fluid medium of this process improves the solvent barrier properties of the resulting blow molded container. The addition of about 0.5 to about 20% by volume of carbon monoxide, about 0.5 to about 50% by volume of carbon dioxide or mixtures thereof to the medium improves the oil barrier properties of the container. About 0.05 to about 25% by volume of oxygen increases the dyeability as well as the oil barrier properties of the container when it is mixed into the medium. Finally, the surface flame retardancy of the container is improved if about 0.5 to about 99% by volume of chlorine, bromine or mixtures thereof are added to the medium. The balance of the fluid medium, if necessary, is an inert gas such as nitrogen, argon, helium and the like.

PREFERRED EMBODIMENT OF THE PRESENT INVENTION

In a preferred embodiment of the present invention, a reactive gas mixture comprising from about 1% to 10% by volume fluorine and 99% to 90% by volume of the inert gas is used as the fluid medium in the blow molding operation. The level of fluorine in the reactive gas mixture is critical to the process of the present invention. If the concentration of the fluorine exceeds about 20 vol.%, the tendency for the fluorine to cause combustion of the plastic is greatly increased because of the relatively high temperatures used during the blow molding process. In fact, it is completely surprising that one is able to simultaneously expand the parison and to fluorine-treat the inner surface of the resulting blown article because of the tendency for plastic materials to burn in the presence of fluorine when temperatures exceed 50°C.

The preferred thermoplastic compositions employed in the process in a polyolefin polymer or copolymer of the following monomers, ethylene, propylene, 1-butene, 1-pentene 4-methyl-1-pentene, 3-methyl-1-butene and 3,3-dimethyl-1-butene. These compositions can also contain optional ingredients such as pigments, fillers, delustrants, plasticizers, flame retardants, antistatic agents, and other materials known in the art to modify the chemical and physical properties of the finished thermoplastic article. These compositions can even contain other plastics blended with the polyolefin.

The invention is further illustrated by reference to the following examples.

EXAMPLE 1

Polyethylene pellets having a density of 0.92 gm/cc were fed into a three zone extruder having temperatures of 149°C., 163°C. and 163°C. for the three zones, respectively. The resulting molten thermoplastic was extruded through the parison extrusion die maintained at 149°C. to form a parison. The parison was then enclosed within a mold and the bottom ends of the parison were sealed. The still molten parison was then expanded into the shape of the mold with a reactive gas mixture having the concentration of fluorine indicated in Table I below. The blowing time was 5 seconds. Water was passed through the mold for approximately 15 seconds to cool the resulting bottle. The fluorine-containing gas was removed from the cooled bottle with air. The mold was then opened and a 1 pint bottle having the very favorable solvent retention characteristics indicated in Table II below was removed.

TABLE I

| RUN | COMPOSITION OF REACTIVE GAS %F$_2$/%N$_2$ | AVERAGE %F INCORPORATED | WALL THICKNESS OF BOTTLE, mils |
|---|---|---|---|
| | By Volume | By Weight | |
| 1 | 1/99 | 0.016 | 12.32 |
| 2 | 5/95 | 0.026 | 13.56 |
| 3 | 10/90 | 0.034 | 9.55 |

Control

The foregoing blow molding operation was repeated except that air was used to expand the parison in the place of the fluorine-containing gas mixture.

The blow molded bottles of the Example and Control (two bottles formed at each level of fluorine concentration) were each filled with approximately equal quantities of toluene. The toluene-containing bottles were then capped with a heat sealable cap line (polyethylene liner heat sealed to top of the bottle) followed by a screw-on metal cap. This type of seal allows virtually no leakage. The bottles were then placed in a hot box at 100°F. The amount of toluene lost from each bottle was recorded in grams at 1, 7, and 14 days of test time. The results are provided in the Table II below for the bottles of the Example and Control.

TABLE II

SOLVENT RETENTION DATA

| | Tare wt. of bottle | 0-day Gross wt. of bottle | 1-day Gross wt. of bottle | 1-day wt. change in grams | 1-day % wt. change |
|---|---|---|---|---|---|
| CONTROL | | | | | |
| A | 27.2 | 276.59 | 222.85 | 53.74 | 19.43 |
| B | 31.72 | 286.7 | 237.85 | 48.85 | 17.04 |
| RUN 1 | | | | | |
| A | 27.34 | 283.84 | 265.28 | 18.56 | 6.54 |
| B | 24.61 | 281.9 | 256.64 | 25.26 | 8.96 |
| RUN 2 | | | | | |
| A | 28.43 | 281.6 | 280.4 | 1.2 | 0.43 |
| B | 28.29 | 284.75 | 283.74 | 1.01 | 0.35 |
| RUN 3 | | | | | |
| A | 29.5 | 277.3 | 277.01 | 0.29 | 0.1 |
| B | 22.82 | 286.91 | 286.69 | 0.22 | 0.08 |

| | 7-days Gross wt. of bottle | 7-days wt. change in grams | 7-days % wt. change | 14-days Gross wt. of bottle | 14-days wt. change in grams | 14-days % wt. change |
|---|---|---|---|---|---|---|
| CONTROL | | | | | | |
| A | 28.95 | 247.64 | 89.53 | 27.19 | 249.40 | 90.17 |
| B | 77.21 | 209.49 | 73.07 | 31.71 | 254.99 | 88.94 |
| RUN 1 | | | | | | |
| A | 151.66 | 132.18 | 46.57 | 102.85 | 180.99 | 63.76 |
| B | 160.02 | 121.88 | 62.39 | 122.39 | 159.51 | 56.58 |
| RUN 2 | | | | | | |
| A | 272.19 | 9.41 | 3.34 | 262.12 | 19.48 | 6.92 |
| B | 274.81 | 9.94 | 3.49 | 263.30 | 21.45 | 7.53 |
| RUN 3 | | | | | | |
| A | 274.98 | 2.32 | 0.84 | 272.40 | 4.90 | 1.77 |
| B | 285.32 | 1.59 | 0.55 | 283.68 | 3.23 | 1.13 |

Table II indicates that contrary to prior art fluorine treatment processes, a significant improvement occurs in the solvent retention characteristics of blow molded polyethylene bottles which have been treated with as little as 1% fluorine in accordance with the process of the present invention. This improvement is of such significance that it is possible to achieve at least a 10% reduction in the wall thickness of the bottles prepared in accordance with this invention over bottles blow molded by prior art techniques.

EXAMPLE 2

The procedure of Example 1 is followed in this Example in which a reactive gas comprising 4 vol.% fluorine, 4 vol.% surfur dioxide and 92 vol.% nitrogen is used in the blow molding operation. The resulting blow molded polyethylene bottle is subjected to the same solvent retention test described above. The per cent change in the weight of the bottle in this Example is approximately 20% less than the change after the same test period for the Run 3 bottles of Example 1 which bottles were blow molded with a reactive gas comprising 10/90% $F_2/N_2$.

EXAMPLE 3

This Example illustrates the oil barrier properties of the resulting blow molded bottles in which carbon monoxide (Run 5), carbon dioxide (Run 6) or oxygen (Run 7) is respectively added to the fluorine-nitrogen blowing gas mixture prior to the expansion step and it illustrates the improvement in such properties over the use of the fluorine-nitrogen mixture per se (Run 4). The same procedure is followed in this Example that was followed in Example 1 in order to produce a blow molded bottle having a thickness of 2 mils. The oil barrier properties for the resulting blow molded bottles for the compositions of Runs 4–7 are set forth in Table III below. The oil barrier data of Table III is measured by filling each of the bottles with motor oil, placing the filled bottles on filter paper and measuring the length of time for the oil to penetrate through to the filter paper.

TABLE III

OIL BARRIER DATA

| RUN | COMPOSITION OF REACTIVE GAS | TIME OF OIL PENETRATION (HRS.) |
|---|---|---|
| 4 | 5% $F_2$/95% $N_2$ | 15* |
| 5 | 5% $F_2$/10% CO/85% $N_2$ | 20 – 25* |
| 6 | 5% $F_2$/10% $CO_2$/85% $N_2$ | 25* |
| 7 | 5% $F_2$/10% $O_2$/85% $N_2$ | 35* |

*Note: The oil penetration for the blow molded bottles is based on observations of polyethylene film having a thickness of 2 mils which has been post-treated with fluorine or fluorine in combination with one of the other reactive gases.

The improvement in the physical properties of the blow molded articles by the present process occurs in both continuous and intermittent extrusion types and injection types of blow molding operations. The specific operating conditions depends on the type of blow molding, the polymer selected and the type of blow molded container, i.e. the size and thickness of the container. In general the temperatures employed during the blow molding operation range from as low as about 120°C. for injection blow molding of certain types of polyolefin copolymers, e.g. ethylene-vinyl acetate, to as high as about 300°C. for injection molding of certain types of high density polyethylene, e.g. density of 0.965. The pressure of the reactive gas mixture during this operation ranges from about 10 to about 150 psig. The blowing time during the expansion stage and cooling time are also dependent on the type of blow molding and the size and thickness of the bottles being formed. The amount of fluorine incorporated into the containers in this process range from about 0.0004% to 0.15% by weight fluorine, preferably from about 0.0005% to 0.05% by weight.

We claim:

1. In a process for the production of blow molded thermoplastic articles wherein a parison of a thermoplastic selected from the group consisting of polymers and copolymers of polystyrene, polyacrylonitrile, polyvinyl chloride, and polyolefins of at least one aliphatic mono-1-olefin having a maximum of 8 carbon atoms per molecule is formed and said parison is then expanded within a closed mold to conform to the contour of said mold by a fluid medium, the improvement which comprises mixing into said fluid medium about 0.1% to 10% by volume fluorine, the balance of said fluid medium being an inert gas, prior to expanding said parison and recovering the resulting article having improved barrier properties.

2. The process of claim 1 wherein the fluid medium also contains a gas selected from the group consisting of 0.5 to about 20% by volume of sulfur dioxide or carbon monoxide, 0.5 to about 50% by volume of carbon dioxide, 0.5 to about 99% by volume of chlorine or bromine and mixtures thereof.

3. A process for producing a blow molded hollow thermoplastic article which comprises the steps of:
   a. heating a thermoplastic selected from the group consisting of polymers and copolymers of polystyrene, polyacrylonitrile, polyvinyl chloride, and polyolefins of at least one aliphatic mono-1-olefin having a maximum of 8 carbon atoms per molecule to a temperature at or above its softening point,
   b. forming a parison of said thermoplastic,
   c. expanding said parison within a closed mold to conform it to the contour of said mold by means of a reactive gas mixture comprising from about 0.1 to 10% by volume fluorine and the balance of an inert gas,
   d. removing the reactive gas mixture from the resulting article, and
   e. recovering said article having improved barrier properties.

4. The process of claim 3 wherein the reactive gas mixture also contains a gas selected from the group consisting of 0.5 to about 20% by volume of sulfur dioxide or carbon monoxide, 0.5 to about 50% by volume of carbon dioxide, 0.5 to about 99% by volume of chlorine or bromine and mixtures thereof.

5. The process of claim 3 wherein said reactive gas mixture comprises from about 1 to 10% by volume fluorine and 99 to 90% by volume nitrogen, argon or helium.

6. The process of claim 3 wherein said thermoplastic comprises a polymer or copolymer of at least one aliphatic mono-1-olefin having a maximum of 8 carbon atoms per molecule.

7. The process of claim 6 wherein said thermoplastic comprises essentially polyethylene having a density of 0.91 to 0.98.

8. The process of claim 3 wherein said reactive gas mixture is removed and the resulting article is cooled by purging with an inert gas.

* * * * *